United States Patent [19]     [11]     4,400,495
Shutov et al.                                    [45]     Aug. 23, 1983

[54] WOOD MODIFYING COMPOSITION

[75] Inventors: Gennady M. Shutov; Maiya E. Erdman; Adel I. Solomakha; Evgeny A. Kalennikov, all of Minsk, U.S.S.R.

[73] Assignee: Belorussky Politekhnichesky Institute, Minsk, U.S.S.R.

[21] Appl. No.: 296,279

[22] Filed: Aug. 26, 1981

[51] Int. Cl.³ .............................................. C08K 5/56
[52] U.S. Cl. ..................................... 524/176; 524/594
[58] Field of Search .................... 260/45.75 P, 32.8 R; 524/176, 594

[56]  References Cited

U.S. PATENT DOCUMENTS 2,485,711  10/1949  Doelling et al. .................... 524/594

Primary Examiner—Joseph L. Schofer
Assistant Examiner—N. Sarofim
Attorney, Agent, or Firm—Ladas & Parry

[57]  ABSTRACT

Disclosed is a wood modifying composition comprising the following components taken in percent by mass:

| phenol-furfural-formaldehyde resin | 72.0 to 94.0 |
| catalyst | 0.8 to 1.5 |
| stabilizing agent | 0.5 to 1.5 |
| organic solvent | the balance to 100. |

4 Claims, No Drawings

WOOD MODIFYING COMPOSITION

FIELD OF THE INVENTION

The present invention is generally concerned with the wood-working industry and has particular reference to to a wood modifying composition.

Wood modified with the herein-proposed composition can be utilized as construction material in corrosive environments, thus as cooling towers, venting pipe stacks, mineral fertilizer storage facilities, livestock breeding facilities, and other building and construction projects; for soil-contacting structures and articles, e.g. wooden forms, casting patterns, grapevine stakes, ties (sleepers), and snow retention boards for roads; in machine building and mechanical engineering, as substitute for ferrous and non-ferrous metals; in parquet- and ski-making and such like industries, as substitute for valuable harder leaf wood species; in the production of sports commodities, specifically as decorative facing and trimming material for the fabrication of souvenir articles, and so on.

DESCRIPTION OF THE PRIOR ART

In recent times, the problem of modifying wood has gained greatly in importance in view of the wood resources having suffered significant losses in a number of countries and the need being felt for improving the durability of wood products, in particular those operating under conditions of elevated ambient temperatures and increased humidity. One leading direction in solving the problem of an overall utilization of wood source materials, a wider usage of softer leaf wood species, and expanding the scope of application for wood in various industries, is that of modifying wood with synthetic resins and monomers which are introduced as liquids and thereafter converted to solids under the action of heat and chemical reagents.

There are known a great variety of wood modifying compositions based on polymerization or polycondensation resins. These compositions are known to improve considerably physical and mechanical properties of the natural starting material. The modified wood therewith becomes substantially a multicomponent composition consisting of a thermosetting synthetic polymer and native high-molecular compounds. The properties of such a system will ultimately depend, in the course of its lengthy use, on the oxidative destruction occurring mostly with the synthetic polymers under the action of the atmospheric oxygen, humidity, and variations in the ambient temperature. Because of this, the problem of mitigation or elimination of the oxidative destruction of the polymers in the course of operation is of a primary concern.

Known in the prior art is a wood modifying composition (Cf. U.S.S.R. Inventor's Certificate No. 321,366, Int. Cl. B 27K 3/34) comprising phenol-furfural-formaldehyde resin, an acid catalyst, and an organic solvent. With the use of said composition wood is impregnated in an autoclave by the vacuum-pressure methods. Next, the impregnated wood is thermally treated in drying chambers with the result that a solid thermosetting polymer based on phenol-furfural-formaldehyde resin cured under the action of the acid catalyst and elevated temperatures is formed. Under operating conditions, the wood modified with the polymer based on phenol-furfural-formaldehyde resin is of limited usefulness through the polymer destruction arising under variations in ambient temperature and humidity.

Variations in the ambient temperature and humidity result in cleavage of hydrogen bonds in the modifying polymer as well as in cleavage of hydrogen bonds arising between the polymer and the wood complex.

Furthermore, under variations in ambient temperature and humidity, the oxidative destruction takes place also directly in the wood complex yielding free radicals.

All the above involves a decrease in physical and mechanical properties of the modified wood, thus cutting down its service life.

SUMMARY OF THE INVENTION

Accordingly, it is an object of the present invention to provide a wood modifying composition permitting to decelerate the process of wood ageing.

With this and other objects in view, there is provided a wood modifying composition comprising phenol-furfural-formaldehyde resin, a catalyst, and an organic solvent, which composition, in accordance with the present invention, further comprises a stabilizing agent, the proportions of the components, in percent by mass, being as follows:

| | |
|---|---|
| phenol-furfural-formaldehyde resin | 72.0 to 94.0 |
| catalyst | 0.8 to 1.5 |
| stabilizing agent | 0.5 to 1.5 |
| organic solvent | the balance to 100. |

The stabilizing agent chemically bonds the reactive centres originating during oxidative destruction of the polymer, thus preventing the proceeding of the destructive processes, and, hence, retaining the physical and mechanical properties of the modified wood under conditions of variations in environmental temperature and humidity.

Incorporation of the stabilizing agent in amounts less than 0.5 percent by mass fails to provide effective stabilization of the modified wood properties under service, whereas the upper limit of the stabilizing agent content, i.e. 1.5 percent by mass, is defined by the solubility of said stabilizing agent in the modifying composition.

It is advisable that the stabilizing agent be ferrocene.

Ferrocene featuring high reactivity, participates, when introduced into the wood modifying composition, simultaneously in the reactions proceeding both by the ionic mechanism and by the free-radical mechanism and therefore stops the oxidative destruction leading to the ageing of the modified wood, while retaining the properties of the natural material throughout the service.

Such a wood modifying composition features a viscosity permitting to provide homogeneous impregnation of the wood.

The stabilizing agent that can be suitably used in the proposed wood modifying composition includes also monoacetylferrocene.

Monoacetylferrocene enters into the reactions proceeding both by the ionic mechanism and by the free radical mechanism and reacts with phenol-furfural-formaldehyde resin to yield a compound having supposedly the following structural formula:

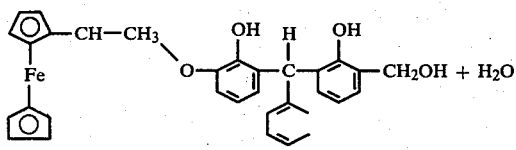

Such a compound is found to be proof against oxidative destruction arising from variations in ambient temperature and humidity.

It is also advisable that the stabilizing agent be a mixture of ferrocene and monoacetylferrocene.

Such a stabilizing agent permits to provide the modified wood featuring stable properties under conditions of variations in environmental temperature and humidity.

The present invention will be more fully understood from the detailed description of its embodiments that follows.

DETAILED DESCRIPTION OF THE INVENTION

An acid catalyst, e.g. benzenesulfonic acid taken in an amount of from 0.8 to 1.5 percent by mass is introduced into phenol-furfural-formaldehyde resin dissolved in an organic solvent, e.g. in acetone, taken in an amount of from 5 to 25 percent by mass. The resultant solution is thoroughly stirred adding afterwards under stirring ferrocene, monoacetylferrocene, or a mixture of ferrocene and monoacetylferrocene in amounts of 0.5 to 1.5 percent by mass. Next, the viscosity of the resultant system is measured using B3-4 viscosimeter, which ranges from 12.0 to 12.5 s.

Upon curing the resultant composition, there are formed compounds of the type of ketals and semiketals. This reaction proceed both in acid and alkaline medium owing to the presence of electron-seeking groups bound with carbonyl group in α-position. As a result of condensation, polimeric compounds are formed including fixed molecules of ferrocene or monoacetylferrocene, that, in turn, inhibit the destructive process and, therefore, the process of ageing of the modified wood under operating conditions.

The wood modified with the use of herein-proposed composition was tested according to the accelerated ageing method, which was carried out as follows. The modified wood was steeped in water for 3 days at a temperature of from 19° to 23° C., whereupon the wood was subjected to drying for 4 days in the following manner: 8 hours of each day at a temperature of 105° to 107° C., and the rest 16 hours at a temperature of 15° to 23° C.

The testing data obtained show a high stability of the proposed wood modifying composition. The losses in compressive strength after 24 cycles of compression in fiber direction are 25.5% for the wood modified with the known composition based on phenol-furfural-formaldehyde resin, 14.6% for the natural starting material, whereas for the wood modified with the proposed composition based on phenol-furfural-formaldehyde resin added with ferrocene the losses in compressive strength are 9.7%, and added with monoacetylferrocene, 9.5%.

The mass losses of the wood modified with the present composition when tested for ageing were reduced approximately by 30%.

Thus, the proposed wood modifying composition makes it possible to upgrade the stabilizing effect of the modifying polymer in the wood by a factor of 2.6.

The invention will be further described with reference to the following illustrative Examples.

EXAMPLE 1

0.8 percent by mass of benzenesulfonic acid serving as a catalyst was introduced into 72.0 percent by mass of phenol-furfural-formaldehyde resin dissolved in acetone. The solution so obtained was thoroughly stirred, whereupon 0.5 percent by mass of ferrocene was added under continuous stirring.

Viscosity of the resultant impregnating system as measured by B3-4 viscosimeter was 12.3 s.

EXAMPLE 2

0.8 percent by mass of benzenesulfonic acid serving as a catalyst was introduced into phenol-furfural-formaldehyde resin taken in amount of 84.0 percent by mass and dissolved in an organic solvent. The resultant solution was thoroughly stirred and 1.0 percent by mass of ferrocene was further added, with stirring, to the solution.

Viscosity of the resulting impregnating system as measured by B3-4 viscosimeter was 12.45 s.

EXAMPLE 3

Introduced into 94.0 percent by mass of phenol-furfural-formaldehyde resin dissolved in an organic solvent were 1.5 percent by mass of benzenesulfonic acid serving as a catalyst. The solution so obtained was thoroughly stirred and 1.5 percent by mass of monoacetylferrocene were further added, with stirring, to the solution.

Viscosity of the resultant impregnating system as measured by B3-4 viscosimeter was 12.27 s.

EXAMPLE 6

0.8 percent by mass of benzenesulfonic acid serving as a catalyst was introduced into phenol-furfural-formaldehyde resin in an amount of 84.0 percent by mass and dissolved in acetone, whereupon the solution so obtained was thoroughly stirred and 1.0 percent by mass of monoacetylferrocene was then added to the solution under continuous stirring.

Viscosity of the impregnating system thus obtained as measured by B3-4 viscosimeter was 12.15 s.

EXAMPLE 7

1.5 percent by mass of benzenesulfonic acid serving as a catalyst were introduced under thorough stirring into 72.0 percent by mass of phenol-furfural-formaldehyde resin dissolved in an organic solvent, adding afterwards, with stirring, 0.5 percent by mass of a mixture of ferrocene and monoacetylferrocene in the ratio of 1:1.

Viscosity of the impregnating system so obtained as measured by B3-4 viscosimeter 12.35 s.

EXAMPLE 8

1.5 percent by mass of benzenesulfonic acid serving as a catalyst were introduced under thorough stirring into 84.0 percent by mass of phenol-furfural-formaldehyde resin dissolved in an organic solvent, whereupon 1.0 percent by mass of a mixture of ferrocene and monoacetylferrocene in the ratio of 1:1 was added, with stirring, to the solution.

Viscosity of the impregnating system so obtained as measured by B3-4 viscosimeter was 12.42 s.

EXAMPLE 9

1.5 percent by mass of benzenesulfonic acid serving as a catalyst were introduced into 94.0 percent by mass of phenol-furfural-formaldehyde resin dissolved in an organic solvent, under continuous stirring. Then 1.5 percent by mass of a mixture of ferrocene and monoacetylferrocene in the ratio of 1:1 were added, with stirring, to the solution.

Viscosity of the resultant impregnating system as measured by B3-4 viscosimeter was 12.47 s.

The present invention affords benefit in that the service life of wood modified with the proposed composition is extended, which will require less wood material and less number of repair operations when carrying out scheduled repair of wooden structures.

In describing the above examples of various embodiments of the present invention, a limited specific terminology has been used for greater clarity. It will be understood, however, that the present invention is by no means restricted by the terminology adopted herein, and that each of the terms used covers all equivalent elements such as may serve the same functions and be used to solve the same problems.

Although the present invention has been described herein with reference to the preferred typical embodiments thereof, it will be apparent to those skilled in the art that there may be minor modifications made in the wood modifying composition of the present invention. All such modifications and variations are contemplated to be embraced in the spirit and scope of the invention, as defined in the appended claims.

What is claimed is:

1. A wood modifying composition comprising the following components take in percent by mass:

| | |
|---|---|
| phenol-furfural-formaldehyde resin | 72.0 to 94.0 |
| benzensulfonic acid catalyst | 0.8 to 1.5 |
| stabilizing agent selected from the group consisting of ferrocene, monoacetylferrocene and mixtures thereof | 0.5 to 1.5 |
| acetone | the balance to 100 |

2. A composition as defined in claim 1, wherein the stabilizing agent is ferrocene.

3. A composition as defined in claim 1, wherein the stabilizing agent is monoacetylferrocene.

4. A composition as defined in claim 1, wherein the stabilizing agent is a mixture of ferrocene and monoacetylferrocene.

* * * * *